UNITED STATES PATENT OFFICE.

LUDWIG OTTO HELMERS, OF HAMBURG, GERMANY, ASSIGNOR TO ICHTHYOL-GESELLSCHAFT CORDES, HERMANNI & CO., OF HAMBURG, GERMANY.

PROCESS OF SEPARATING SULFONIC ACIDS.

SPECIFICATION forming part of Letters Patent No. 709,321, dated September 16, 1902.

Application filed August 30, 1901. Serial No. 73,863. (No specimens.)

*To all whom it may concern:*

Be it known that I, LUDWIG OTTO HELMERS, a subject of the German Emperor, and a resident of Hamburg, in the German Empire, have invented certain new and useful Improvements Relating to the Process of Separating Sulfonic Acids and Their Salts, of which the following is a specification.

It has been known for a number of years that when acids obtained by the action of sulfuric acid upon sulfureted hydrocarbons—such as, for example, ichthyol sulfonic acid—also solutions of the inorganic salts of these sulfonic acids are treated with a solution of an alkaloid or alkaloidal salt, it yields a precipitate which consists of the alkaloid salt of such sulfonic acid. (See Harold Wyatt, *The Chemist and Druggist*, December, 1895, and Karl Ullmann, *Aerztlicher Central-Anzeiger*, 1893, Nos. 5 and 6.) Careful experiments have shown that not only alkaloids, but also other organic bases—such as anilin, piperazin, dimethylphenylpyrazolon—are precipitated by the said sulfonic acids, and it has also been found that besides the said insoluble sulfonic salts of the organic bases there are formed soluble salts—that is to say, salts which after the reaction remain dissolved in the solution. The organic bases therefore exhibit a similar behavior as that described with reference to the alkaline-earth and heavy metal salts of these sulfonic acids in the specification of the United States Patent No. 671,135, dated April 2, 1901. Therefore the neutralization of these sulfonic acids with organic bases renders it possible to produce, likewise, a separation of these acids into acids rich in sulfur and giving salts readily soluble in water and into acids poor in sulfur and giving salts mostly insoluble in water quite analogous to the processes described in the specification of the aforementioned patent. Again, in these salts with organic bases the proportion soluble in water is dependent upon the nature of the base used. As, for example, the proportion of lime salts soluble in water is greater than that of barium salts, so, also, anilin produces a greater percentage of salts soluble in water than does piperazin. By the use of different bases it will therefore be possible to separate from the original acid mixture sulfonic acids of higher or lower percentage of sulfur.

The following examples may serve to explain the process:

First. One kilogram of the sulfonized product obtained by the reaction of concentrated sulfuric acid upon Seefeld oil and which has been freed from any free sulfuric acid is dissolved in four liters of water. This solution is treated with about three hundred grams of anilin suspended in water, and the superfluous anilin is then removed by blowing steam into the mixture. After some time a dark-brown deposit is formed at the bottom of the vessel. The yellowish-brown liquid above the said precipitate is decanted and evaporated. The residue thus obtained after completely drying is a brown-yellow hygroscopic powder having little odor and a peculiar flavor. The analysis of this salt gives a proportion of twenty-nine per cent. of anilin and 15.7 per cent. of sulfur. Thus the acid contains 22.2 per cent. of sulfur. The precipitate at the bottom of the vessel which has been formed by the addition of anilin to the sulfonized product is, as far as possible, freed from any remaining liquid and then dried. Thus a brown readily-pulverizable substance which is nearly insoluble in water is obtained. In this substance the proportions of anilin are found to be 13.5 per cent. and those of sulfur to be 14.3 per cent. From this is calculated the proportion of sulfur to be 16.5 per cent. for the part combined with anilin of the sulfonized product.

Second. A twenty-per-cent. aqueous solution of the sulfonized product mentioned in the example No. 1 is neutralized under heat with piperazin. After some time the liquid is decanted off from the precipitate and evaporated. The soluble piperazin salt obtained from the dried residue forms a yellowish powder containing seventeen per cent. of piperazin ($C_4H_{10}N_2$) and nineteen per cent. of sulfur. In the acid is therefore contained twenty-three per cent. of sulfur. The insoluble salt obtained in the form of a precipitate by the said addition of piperazin is pressed and dried and forms an almost tasteless greenish-brown powder. In this substance is found seven per cent. of piperazin and sixteen per cent. of sulfur, so that the acid contains 17.2 per cent. of sulfur.

Instead of the free acids and free bases the corresponding salts—for example, the sodium salt of the sulfonic acids—may be treated with an equivalent quantity of anilin sulfate. In this case, however, the portion soluble in water of the sulfonic anilin salt is contaminated with sodium sulfate, which may be easily removed by suitable means, such as by dissolving the anilin salt in alcohol.

The salts soluble in water of the sulfonic acids with organic bases are generally of lighter color than the insoluble salts. They are mostly soluble in alcohol and glycerin and insoluble in ether and benzol. Their watery solutions produce no precipitates with the salts of alkalin earths and heavy metals, as the sulfonic acids obtained from these soluble salts of the organic bases form with alkaline-earth and heavy metal salts likewise salts which are also soluble in water. These salts, as also the acids, are entirely like the compounds described in the specifications of the United States Patent No. 671,135, aforesaid, and pending application, Serial No. 729,355, filed September 2, 1899. The salts of the organic bases insoluble in water dissolve in rather large quantity in watery solutions of the sulfonic acids and their salts and also in solutions of the free organic bases. In alcohol the salts generally are very little dissolved. A larger portion can be dissolved in benzol, while in chloroform they are almost completely dissolved. Ether and petroleum-ether extract from the insoluble salts a neutral reacting oil, the so-called "sulfon" when a sulfonic acid containing sulfon is used for the production of the salt. The insoluble salts are decomposed by means of mineral acids. If, for example, the precipitate is heated with muriatic acid, the base is dissolved as muriate, while the sulfonic acid remains at first undissolved, but becomes readily dissolved by an addition of pure water, especially if slight heat be applied. The insoluble salts are readily soluble, mostly already in the cold, in alkalies, even in alkaline carbonates, and in ammonia. It is owing to this property that the neutralization of the sulfonic acids with organic bases yields or presents an advantage over the conversion of the acids into their alkaline-earth and heavy metal salts, as owing to the facility of separating the organic base it is not difficult to obtain from the insoluble salts the free acids or alkaline salts of these, sulfonic acids being poor in sulfur, whereas the insoluble alkaline-earth and heavy metal salts can only be converted into their alkaline salts after prolonged heating and mostly under partial decomposition.

Having fully described my invention, what I claim, and desire to secure by Letters Patent, is—

The process of separating sulfonic acids into compounds rich in sulfur and compounds poor in sulfur, which consists in converting the sulfonized products obtained by the action of sulfuric acid upon sulfureted hydrocarbons into salts of organic bases and separating the portions of the salts thus obtained which are soluble in water from the insoluble portions, substantially as and for the purpose set forth.

LUDWIG OTTO HELMERS.

Witnesses:
 ALEXANDER SPECHT,
 E. H. L. MUMMENHOFF.